April 15, 1958   R. A. KIZZEK   2,830,923
METHOD OF CLOSING THE END OF A BALLOON ENVELOPE
Filed Nov. 3, 1954   2 Sheets-Sheet 1

INVENTOR.
ROGER A. KIZZEK
William C. Strieter
ATTORNEY

April 15, 1958 R. A. KIZZEK 2,830,923
METHOD OF CLOSING THE END OF A BALLOON ENVELOPE
Filed Nov. 3, 1954 2 Sheets-Sheet 2
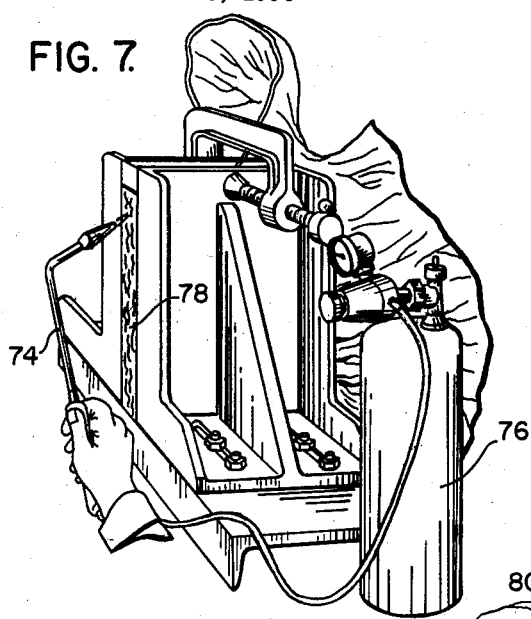
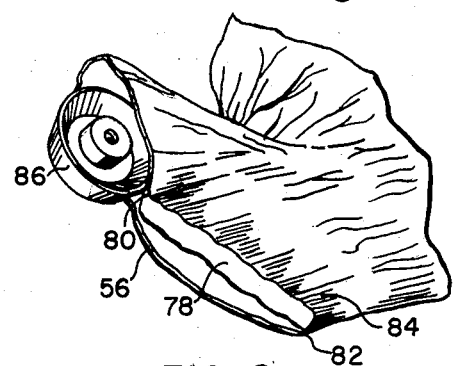
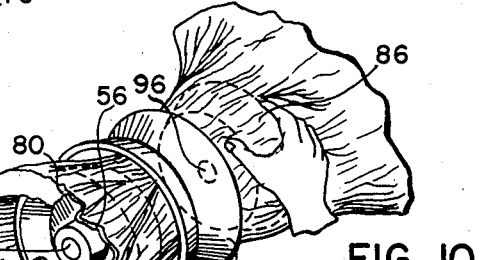
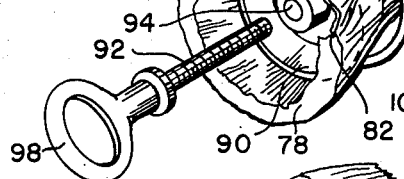
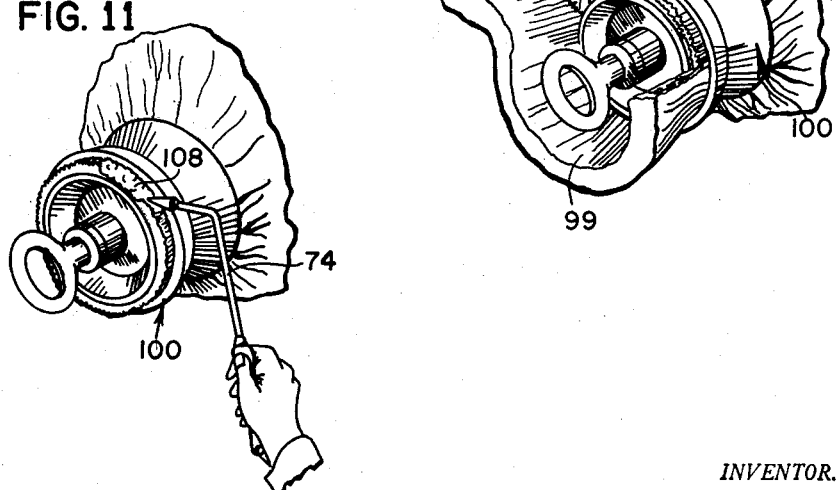
INVENTOR.
ROGER A. KIZZEK
William C. Strueber
ATTORNEY

United States Patent Office 2,830,923
Patented Apr. 15, 1958

2,830,923

METHOD OF CLOSING THE END OF A BALLOON ENVELOPE

Roger A. Kizzek, Minneapolis, Minn., assignor to General Mills, Inc., a corporation of Delaware Application November 3, 1954, Serial No. 466,628

7 Claims. (Cl. 154—85)

The present invention relates to improvements in methods of sealing or closing the ends of high altitude load carrying balloons.

High altitude balloons are being used which are made of light weight non-extensible thermoplastic material. This material, an example of which is polyethylene, is non-permeable to gas, can withstand very low temperatures, and, being very light in weight, is capable of carrying heavy loads to high altitudes. One of the types of balloons of this material is formed of elliptically shaped gores which are joined to each other to form a stream-lined balloon. Load bearing tapes are placed over the seams to form a harness to carry the weight of the payload at the bottom of the balloon and distribute its weight over the area of the thermoplastic balloon envelope.

Newer developments in the art have led to the use of tapeless balloons in which the balloon envelopes before inflation have the shape of an elongated tube or cylinder having enough balloon material at the upper and lower end of the balloon to support the payload without the necessity of using load bearing tapes. In this type of balloon the extra material which is provided at the upper and lower end of the balloon is of light weight thin thermoplastic but this material is capable of carrying the load without tearing if enough material is available and if the load is secured to the balloon so that the weight is evenly distributed to all the material available and localized concentrations of stress in the material will not occur.

It is accordingly an object of the present invention to provide an improved method of gathering and arranging the material at the end of a cylindrical type balloon and of clamping the material so that it will remain properly arranged with the weight of the load evenly distributed, preventing localized stress concentrations.

Another object of the invention is to provide an improved method of gathering the material at the open end of a cylindrical type balloon and sealing the material to positively prevent the escape of lifting gas or the entrance of atmospheric air to mix with the balloon gas.

Other objectives and advantages will become more apparent in the following specification and claims taken in connection with the drawings in which:

Fig. 7 is a perspective view illustrating the application of heat to the gathered balloon folds which have been trimmed;

Fig. 8 is a perspective view of the balloon illustrating the insertion of a member of the clamping fitting into the balloon;

Fig. 9 is a perspective view illustrating the application of the remainder of the end fitting;

Fig. 10 is a perspective view illustrating cutting the excess material from the balloon after the fitting has been attached; and Fig. 11 is a perspective view illustrating the final step in sealing the balloon end.

Figure 1:
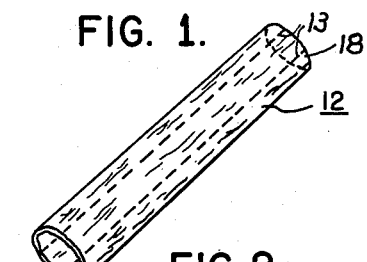
Figure 1 is a perspective view of an envelope of light weight thermoplastic material for a cylindrical type balloon.
Figure 2:
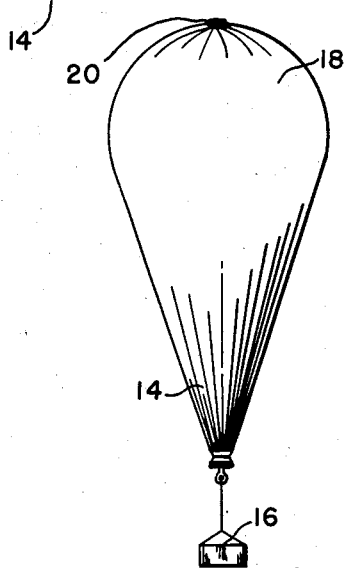
Fig. 2 is a perspective view of a cylindrical type balloon in flight, the end closure for the balloon having been applied according to the methods taught by the present invention.

The balloon envelope is shown in Figure 1, being of the type which is cylindrical in form and which requires that the ends be gathered and sealed for completion of the balloon. The balloon after completion and inflation is shown in Fig. 2 with the ends closed and a load attached.

The balloon envelope 12 may be cylindrical comprising a length of light weight thermoplastic material such as polyethylene which is continuous. This length may appear as extruded from dies during manufacture or may be fabricated of sections of rectangular material which are joined to each other at their edges by seams 13. The balloon does not necessarily have to be cylindrical but may be the tailored or modified cylindrical type which is somewhat tapered at the ends with enough material being left in the upper and lower ends 14 and 18 to support the payload 16 without exceeding the allowable stress of the material.

In either form of balloon, the fully cylindrical, the tailored or modified cylindrical, the material at the upper and lower end must be carefully gathered and secured so that the weight of the load is evenly distributed to all of the material thus preventing any concentrations of stress from occurring. The upper end 18 of the balloon is evenly gathered and secured by a connector 20. (The method of securing the balloon ends in the present invention is the same for the bottom or top end of the balloon and for the sake of brevity the method of securing the bottom end will be described.)

Figure 3:
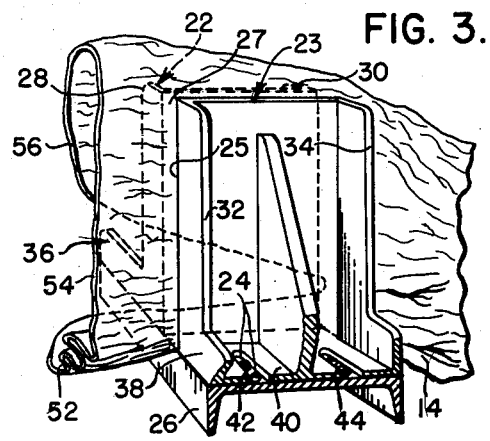
Fig. 3 is a perspective view of a fixture which is used for gathering the balloon material prior to sealing the end of the balloon and illustrating one of the first steps of the method of sealing the balloon.

The first step in the method of the present invention is illustrated in Fig. 3. A preferred type of jig or fixture used for this step is illustrated as comprising a pair of upright guide members 22 and 23. These guide members have inner spaced flat faces 24 and 25 between which the material of the balloon is gathered and squeezed. The guide members are secured to a base 26 and the guide member 23 is adjustable on the base so that the space 27 between the inner faces may be adjusted and fixed.

The jig or fixture may be constructed with the uprights 22 and 23 formed of metal such as channel aluminum having the flat portions of the channel facing each other and with the side flanges 28, 30, 32 and 34 of the channel extending away from the space 27 between the faces of the uprights.

The support 36 for the upright 22 is also formed of a section of channel aluminum as is the support 38 for the upright 23. A strengthening strut 50 is welded between the upright and the base of the member 23 and a similar strut, not shown, is positioned on the back of the member 22. The supports 36 and 38 face downwardly and are secured to the base 26. Support 36 may be secured to the base such as by welding. The support 38 has a pair of elongated slots 42 and 44 for purposes of bolting the support and its upright to the base.

Figure 4:
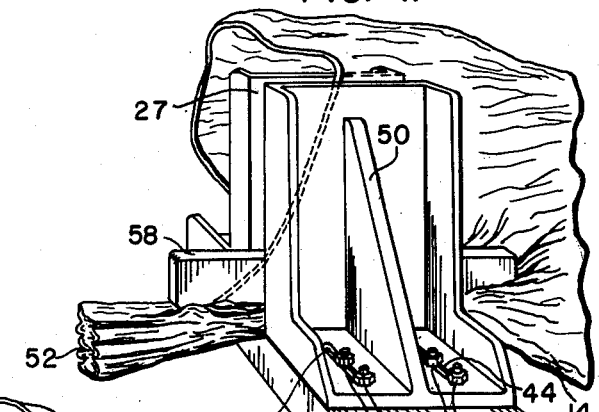
Fig. 4 is a perspective view illustrating a succeeding step in the method shown in Fig. 3.

Bolts 46, Fig. 4, extend through holes in the base 26 and up through the slot 42. Bolts 48 extend through other holes in the base and through the slot 44. For adjustment, the upright 23 is moved until the space 27 is the proper width and the heads on the bolts 46 and 48 are then tightened. It is important that the space 27 between the uprights be correct and the method of determining the space will be herein later described.

Figure 6:
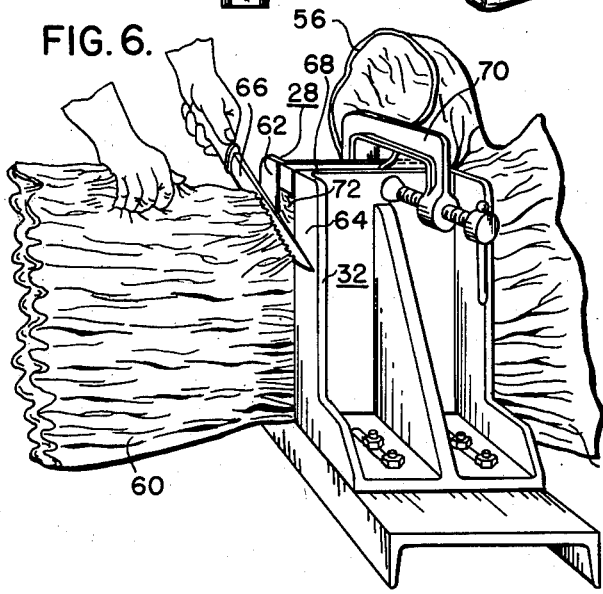
Fig. 6 is a perspective view illustrating severing the excess material from the balloon end after the material has been gathered and pleated.
Figure 5:
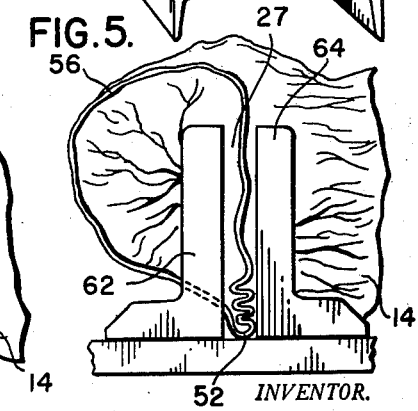
Fig. 5 is an elevational view taken from the end of the fixture used in gathering the material and illustrating the position of the material as it is gathered.

To gather the balloon material prior to closing the end of the balloon, the material is pleated and pressed between the uprights 22 and 23. To accomplish this the material is first laid in the space 27 and then drawn from one direction only and pleated or folded to form the doubled pleats 52 in the bottom of the slot. As is illustrated in Figs. 5 and 6, the material is first laid along the bottom of the fixture to project out of the back in a loop 56. The balloon material is then drawn from the other direction and folded or pleated on top of the first layer which lies on the bottom. This process is continued, drawing the material 54 from one direction only, Fig. 5, thus leaving the free loop 56 of balloon material.

The material is compressed into the bottom of the space 27 with the aid of a block 58 which slides down between the uprights and this block is pressed down against the material preferably after each few additional pleats or folds 52 are made. The pleats are made so that the material which projects beyond the fixture, as shown at 60, is even at the end as shown in Fig. 6. With the material thus evenly pleated the end of the balloon envelope will be evenly drawn together which is essential to obtaining a balloon closure that is capable of supporting a load without suffering stress concentrations which would tear the material. Drawing the material from one direction for pleating as is shown in the drawings, evenly gathers the material to bring it to a central point evenly arranged about the balloon axis. All the material of the end of the balloon is thus gathered with the exception of the small remaining free loop 56 which runs beneath the pleats 52 across the floor of the space 27 and projects from the rear end of the fixture as is shown in Fig. 6.

When all the material is thus pleated and pressed between the uprights of the fixture, the excess material 60, Fig. 6, is cut from the balloon end 14. The flat faces 62 and 64 of the webs 28 and 32 of the upright act as a flat guide for the knife 66 which is used for cutting the material. This material may be cut either manually as is shown in the drawing or with the aid of a machine. To help hold the pressed completed balloon material snugly between the uprights a block 68 may be slipped into the top of the space 27 and held therein by a C-clamp 70.

The raw cut edge 72 of the balloon material is then welded by the application of heat to hold the material in its compressed pleated condition. To accomplish the welding, Fig. 7, heat is applied such as by an acetylene torch 74 supplied with gas from a tank 76. This welding creates a heavy seam or welded bead 78 at the edge of the material.

Since the material was gathered in even pleats, drawing the material from one direction only, and the pleats were formed so that the material projecting beyond the fixture was uniform in length, the welded bead 78 now holds the material in its uniformly gathered condition.

It will be recalled that the small loop 56 of the material was led to the back of the fixture beneath the folded pleats 57 so that it would not be affected by the heat of the torch and would not be joined with the pleated material. This loop 56 is shown in Fig. 8 at the end of the balloon and connects to the ends 80 and 82 of the heavy seam 78 holding the pleated material 84 together. The purpose of this loop is to provide an opening into the balloon for inserting an element 86 of the end fitting and this insertion is illustrated in Fig. 8.

As was previously stated the pleats 84 of the balloon material were made by drawing the material from only one direction which evenly takes up material around the circumference of the balloon end. The important feature is gathering the material evenly. This evenness of gathering obtains an equal distribution of stress from the weight of the load of the balloon. Gathering could be done by starting at a point and drawing the material from both directions. This of course would require a fixture open at both ends. When the element 86 of the balloon end fitting is inserted into the balloon and positioned as is shown in Fig. 9, the heavy seam 78 is curved to fit into an annular ring 80 which is part of the end fitting. Curving the heavy seam causes the ends 80 and 82 of the seam to be brought toward each other with the free loop 56 therebetween. The material 56 of the loop is preferably pleated between the ends of the heavy seam 78, Fig. 9, to fit smoothly and neatly therebetween with the pleats or folds being of the same width as the pleats which were made in Figs. 3–5 and which formed the heavy seam. With this seam 78 formed into an annular shape the remainder of the balloon end fitting may be installed, the complete fitting consisting of the annular ring 88 and a clamping member 90 in addition to the first clamping member 86.

In Fig. 9 the ring 88 is shown slipped over the end of the balloon. As mentioned the ends of the heavy seam 78 touch with the pleats of the loop 56 between. It will be noted at this point that the material will fit smoothly into the ring if the length of the heavy seam 78 is equal to the circumference of the inner surface of the ring 88. The length of the seam was of course determined by the width of the gap between the uprights 22 and 23 between which the material was pleated. The following are the pertinent dimensions of a fixture which was used to successfully fabricate a balloon:

Balloon material: polyethylene, .002 inch thick
Balloon envelope: cylindrical, 1768 inches in circumference; 17 rectangular gores each 104 inches wide
Balloon capacity: 500 pounds payload, 50,000 feet altitude
Inside circumference of ring 88: 9 inches
Length of heavy seam 78: 9 inches
Width of gap between uprights 22 and 23: ½ inch
Total length of uprights: 12 inches This width of gap used with the 2 mil material for the size of balloon described resulted in a seam 9 inches long which fitted neatly within the inside surface of the ring. The end fitting then was capable of clamping the material smoothly and evenly and very securely since the material was evenly distributed around the inner surface of the ring.

The fixture having uprights 12 inches long is suitable for use where the inner circumference of the holding ring is larger than 9 inches such as where a much larger balloon is used. Since the space between the uprights is adjustable, the proper length of seam can be obtained by adjusting to the proper gap.

Returning to the method of applying the end fitting, after the ring 88 is slipped over the end of the balloon material the clamping element 90 is slipped into the end opening formed by the curved heavy seam of material 78. The two clamping elements 86 and 90 are then drawn together by a bolt 92. The bolt extends through a hole 94 in the lower clamping member 90 to be threaded into a hole 96 in the upper clamping member 86. When the bolt 92 is tightened the clamping elements 86 and 90 are drawn together to compress the pleated material and force it against the inner surface of the annular holding ring 88 thus closing the end of the balloon.

The bolt 92 is provided with an eye 98 to which the load 16 may be secured as is illustrated in Fig. 2. Since the end fitting is securely attached to the end of the balloon, the weight of the load is transmitted through it to the pleated end of the balloon.

Thus the pleated material as uniformly gathered in the fixture and as held in its position by the secured end seam 78, is equally distributed around the end clamp and will remain in this position when clamped. It is of paramount importance to securing the balloon end that the material be equally distributed about the end fitting so that the weight of the payload will be equally distributed to all sides of the balloon.

It is also important that the material be brought together to as near a point as possible as is taught by the copending application, Balloon and Fitting for Balloon Ends, Froehlich, Serial No. 466,630 filed November 3, 1954, and the present invention is well suited to securing the material at a point.

After the end fitting is applied, the material may be further sealed to take care of the small loop of material 56 and to prevent any gas which might escape past the fitting from leaking from the balloon and also to prevent atmospheric air from passing through the fitting and mixing with the gas. The excess material 99 projecting past the fitting 100, Fig. 10, is removed such as by a knife 102 leaving a raw edge 104. This raw edge is sealed as by a torch 74 as shown in Fig. 10. This sealing forms a positive seal 108 preventing leakage and also creates a bead at the lower edge of the material which helps prevent the end fitting 100 from slipping off the end of the balloon. The material joined to form the bead 108 is also positively held so that individual layers of the material will not slip up through the fitting to cause concentrations of weight or stress on the remaining layers.

It will be seen that in closing the end of the balloon by the above method the material has been equally and evenly distributed about a common central point which is coincident with the balloon axis. The end of the balloon is sealed and the folds are firmly held in place relative to each other and relative to the end fitting so that shifts in layers of material will not occur to cause concentrations of stress. The method is simple and rapid to perform and can be done in the field and the fixture provided for gathering and pleating the balloon ends is simple and inexpensive in construction. The entire apparatus is rugged and easily handled and is adapted to inexpensive and efficient balloon production.

I have, in the drawings and specification, presented a detailed disclosure of the preferred embodiment of my invention. It is to be understood that the invention is susceptible of modifications, structural changes and various applications of use within the spirit and scope of the invention and I do not intend to limit the invention to the specific form disclosed but intend to cover all modifications, changes and alternative constructions and methods falling within the scope of the principles taught by my invention.

I claim as my invention:

1. The method of closing the bottom open end of a cylindrical type plastic balloon envelope which comprises gathering the lower end of the balloon together in a compressed bunch, cutting the edge from the gathered end to present an even edge while in the compressed condition, applying heat to the even edge to weld the thermoplastic edge and form a seal, and applying a rigid clamp to the balloon material adjacent the sealed edge to further seal the balloon end and prevent stress on the edge.

2. A method of closing the end of a balloon envelope formed of a thermoplastic material which comprises gathering the excess material at the open end of the balloon by drawing the material together in small pleated folds from one direction only, gathering the material from said one direction until all the material has been gathered and pleated to form a stack of pleats except for a free loop of material extending from the first pleated fold to the last pleated fold, and applying heat to the folded gathered material permitting the free loop to remain unheated to seam the gathered material and leave the loop free for insertion of an end fitting member into the balloon end.

3. The method of closing the end of a balloon envelope formed of a thermoplastic material which comprises gathering the material of the open end by drawing the edge of the material together toward a starting point and pleating the material as it is drawn, continuing to pleat the material until the pleats are gathered in a compressed stack and a small loop of free material remains joining the ends of the stacked pleats, applying heat to the edge of the material of the stacked pleats to form a permanent heavy seam to hold the pleats in gathered position, inserting an end securing fitting through the remaining unsealed loop of the balloon, and pressing the sealed stacked pleats to the contour of the end securing fitting and clamping the material in that position.

4. The method of closing the end of a balloon envelope formed of a thermoplastic material which comprises gathering the material of the open end by drawing the edge of the material together toward a starting point and pleating the material as it is drawn, continuing to pleat the material until the pleats are assembled in a compressed stack and a small loop of free material remains joining the ends of the stacked pleats, applying heat to the edge of the material of the stacked pleats to form a heavy seam to hold the pleats in gathered position, inserting an end clamping securing member through the remaining unsealed loop of the balloon, and applying a clamping fitting to clamp the pleated material above said heavy seam, and sealing the material below the clamping member including said free loop of material.

5. A method of closing the end of a balloon envelope formed of a thermoplastic material which comprises gathering the edge of the balloon opening together in pleats, applying heat to the edge of the gathered material to form a seam to hold the material in gathered condition, applying an end clamping member to the material above the seamed edge to close the end of the balloon and hold the material in gathered condition, cutting the free material and the seamed edge from the end of the balloon below the lower edge of the clamping member, and resealing the gathered material as clamped by the clamping member by applying heat to the free cut edge of the material to seal the layers of material at the balloon edge and to form a bead to prevent the clamping member from sliding from the end of the balloon.

6. A method of closing the end of a balloon formed of a thermoplastic material which comprises gathering the material at the open end of the balloon by drawing it toward a starting point and forming successive folded pleats which are stacked on top of each preceding pleat, continuing to pleat the material from said one direction until only a small loop of the material remains connecting the first and the last pleat and leading to the interior of the balloon, applying heat to the stacked pleats to seal the edge thereof to hold the material in pleated position, inserting an element of a clamping member through the loop to the interior of the balloon, wrapping the pleated material around the clamping member, clamping the material to the clamping member in said wrapped position, cutting the material from the balloon below the edge of the clamping member to remove the excess material from the balloon end, and applying heat to the cut edge of the material to form a seam at the edge of the clamping member to prevent the escape of gas through the clamping member.

7. A method of closing the end of a balloon envelope formed of thermoplastic material by clamping the material within an annular clamping ring which comprises gathering the end of the balloon material by drawing the material toward a starting point and forming folded pleats, each succeeding pleat to be stacked on the previous pleat, the width of the pleats being determined so that the height of the stack of pleats will equal the inside circumference of the clamping ring, rounding the stack of pleats to form a circle and placing the clamping ring over the rounded stack of pleats, and clamping the rounded stack of pleats to the inner surface of the clamping ring.

References Cited in the file of this patent

UNITED STATES PATENTS

| | | | |
|---|---|---|---|
| 2,126,834 | Steinberger | Aug. 16, | 1938 |
| 2,484,340 | Gardner | Oct. 11, | 1949 |
| 2,584,632 | Southwick | Feb. 5, | 1952 |
| 2,602,609 | Huch et al. | July 8, | 1952 |
| 2,653,647 | Swartz | Sept. 29, | 1953 |
| 2,666,472 | Hosfield | Jan. 19, | 1954 |
| 2,666,600 | Huch et al. | Jan. 19, | 1954 |
| 2,685,911 | Haller | Aug. 10, | 1954 |
| 2,715,597 | Hosfield | Aug. 16, | 1955 |
| 2,758,804 | Hakomaki | Aug. 14, | 1956 |